United States Patent [19]

Hallwirth

[11] Patent Number: 5,737,213
[45] Date of Patent: Apr. 7, 1998

[54] CONTROLLING SYSTEM FOR DETERMINING A SYSTEM DEVIATION

[75] Inventor: Volker Hallwirth, St. Georgen, Germany

[73] Assignee: Siemens Aktiengesellschaft, Germany

[21] Appl. No.: 553,572

[22] PCT Filed: May 18, 1994

[86] PCT No.: PCT/DE94/00575

§ 371 Date: Nov. 27, 1995

§ 102(e) Date: Nov. 27, 1995

[87] PCT Pub. No.: WO94/28470

PCT Pub. Date: Dec. 8, 1994

[30] Foreign Application Priority Data

May 26, 1993 [DE] Germany ............ 43 17 538.4

[51] Int. Cl.$^6$ .................................................. G05B 13/02
[52] U.S. Cl. ........................ 364/140; 364/173; 364/148
[58] Field of Search ............................ 364/140, 141, 364/142, 143, 148–151, 160–182; 395/900, 903; 318/561; 323/235

[56] References Cited

U.S. PATENT DOCUMENTS

| 4,328,556 | 5/1982 | Abe et al. | 364/140 |
| 5,355,065 | 10/1994 | Narazaki et al. | 364/148 |
| 5,534,766 | 7/1996 | Bonissone et al. | 323/235 |

FOREIGN PATENT DOCUMENTS

| 0 481 492 | 4/1992 | European Pat. Off. | G05B 13/02 |
| 37 43 438 | 6/1989 | Germany | G05B 19/04 |

OTHER PUBLICATIONS

Automatisierungstechnik –At, vol. 41, No. 5, May 1993, Munich, DE, pp. 180–184, T. Bertram et al.: *Zur Kompensation der Trockenen Reibung Mit Hilfe der Fuzzy–Logik*.

Proceddings of the American Control Conference, vol. 1, 26 Jun. 1991, Boston, US, pp. 821–826, S. Chiu et al.: *Fuzzy Cotroller Design and Stability Analysis for an Aircraft Model*.

1993 IEEE International Conference on Neural Networks, vol. 2, 28 Mar. 1993, San Francisco, CA, pp. 610–619, P. Bonissone et al.: *Fuzzy Logic Controllers: From Development to Deployment*.

Fuzzy Sets and Systems, vol. 47, No. 1, Apr. 1992, Amsterdam, NL, pp. 13–21, W. Qiao et al.: *A Rule Self–Regulating Fuzzy Controller*.

Primary Examiner—Reba I. Elmore
Assistant Examiner—Steven R. Garland
Attorney, Agent, or Firm—Kenyon & Kenyon

[57] ABSTRACT

A controlling system includes a comparator unit, which determines a system deviation from a reference variable and a controlled variable, and comprising a correcting device, which is arranged downstream from the comparator unit and which determines a manipulated variable of a controlled system. As a result, the controlling system acts quickly on this manipulated variable in that, from the controlled variable, a differential device determines a difference quotient and supplies it to the correcting device. The correcting device, in accordance with a control instruction, from the difference quotient and the system deviation, starting from an instantaneous state, selects a sequential state and acts on the manipulated variable in accordance with this sequential state. The invention is used in programmable controllers.

2 Claims, 3 Drawing Sheets

CONTROLLING SYSTEM FOR DETERMINING A SYSTEM DEVIATION

BACKGROUND OF THE INVENTION

The invention relates to a controlling system comprising a comparator unit, which determines a system deviation from a reference variable and a controlled variable, and comprising a correcting device, which is arranged downstream from the comparator unit and which determines a manipulated variable of a controlled system process.

Generally, controlling systems are used to solve automatic feedback control tasks, e.g., to control the speed of a motor. The speed of a variable-speed controlled motor is determined by a measuring device of the controlling system and fed to a comparator unit. From the acquired controlled variable corresponding to the motor speed and from a reference variable corresponding to a setpoint speed, the comparator unit forms a system deviation. From the system deviation, a correcting device produces a manipulated variable, which acts on a controlled system and effects the desired adjustment of the controlled variable.

The described automatic feedback control task can also be solved by a programmable controller using a program for that purpose. First, the controlled variable existing in analog form is sampled and converted into a digital form. From the controlled variable in digital form and the reference variable, the programmable controller subsequently computes the system deviation and, in accordance with a control algorithm from the system deviation, the manipulated variable. The manipulated variable is output after being converted into an analog quantity. This type of conventional programmable controller has the disadvantage that the individual instructions of the control program are gradually read out from a memory device, interpreted, and the corresponding operations are finally carried out. The time span required to process the control program determines when the reference variable and the controlled variable are sampled. Moreover, the accuracy with which the controlled variable is converted from the analog into the digital form must conform to the desired control accuracy. In addition, individual adaptations of the controlling system to the properties of the controlled system are mostly only possible by increasing the sampling time.

These disadvantages may be eliminated in part by fuzzy controllers. With fuzzy controllers, the instantaneous values of the reference variable and of the controlled variable are initially converted into truth values, for which the numerical range of values of the variables being considered is characterized by linguistic values and described by a membership function (fuzzification). Finally, the linguistic rules are processed and the membership function is retranslated into a representative numerical value of the manipulated variable y (defuzzification). The fuzzy controllers, however, also have the disadvantage of long sampling times.

A process for producing control signals in dependence upon input signals by means of a finite automaton is disclosed in DE-OS 37 43 438. The data storage unit of the automaton is partitioned into areas (or sectors) each one of which is allocated to one instantaneous state. Each area is also divided into subareas. These subareas are each allocated to an input vector: the combinations of the input variables relevant to the current instantaneous state. From the totality of the current incoming input variables, those input variables which are relevant to the current instantaneous state are selected as current input. The subarea of the data storage unit corresponding to the selected input vectors is read out from the area allocated to the instantaneous state and allocated to the current input vector. The reaction time to state changes of the input variables is thereby shortened.

SUMMARY OF THE INVENTION

The present invention is a controlling system for automatic feedback control tasks which acts quickly on a manipulated variable. The controlling system comprises a comparator unit, a correcting device, and a differential device. The comparator unit determines the system deviation from a reference variable and from a controlled variable. The differential device generates a difference quotient from the controlled variable. The correcting device determines a manipulated variable and is arranged downstream from the comparator unit. The correcting device receives the difference quotient from the differential device and receives the system deviation from the comparator unit. The correcting device, in accordance with a control instruction, starting from an instantaneous state selects a sequential state. Then, the correcting device acts on the manipulated variable in accordance with the sequential state.

In another embodiment, the correcting device allocates a first digital vector to a specifiable range of values of the system deviation and allocates a second digital vector to a specifiable range of values of the difference quotient. The correcting device spans a state plane exhibiting states by the first and second digital vectors and then selects states with multiple digital vector pairs.

The correcting device may also perform the action on the manipulated variable, in accordance with the sequential state, by a function created in advance.

The controlling system according to the invention is provided, in particular, for a programmable state controller.

DETAILED DESCRIPTION

Figure 1:
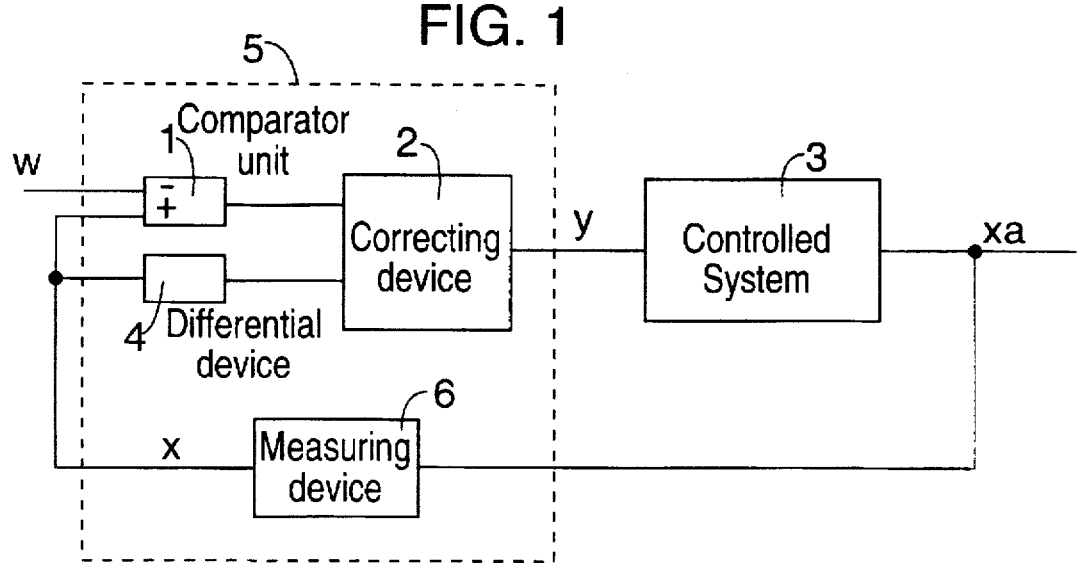
FIG. 1 illustrates a controlling system.

As shown in FIG. 1, a controlling system 5 comprises a comparator unit 1 and a measuring device 6. The measuring device 6 derives an acquired controlled variable x from a controlled variable xa. From a reference variable w and an acquired controlled variable x, the comparator unit 1 determines a system deviation d of the form $$d = kl\ (x(t) - w(t))$$

at an instant t, where kl represents a constant quantity. From the controlled variable x, a differential device 4 generates, at an instant t+$\Delta$t, a difference quotient of the form $$x(t) - x(t - \Delta t)\ q = \Delta t$$

The difference quotient is supplied, together with the system deviation d, to the correcting device 2 arranged downstream from the comparator unit 1. The correcting device 2 having a memory device selects a sequential follow-up state, in accordance with a control instruction stored in this memory device, in dependence upon the system deviation d, the difference quotient q, and an instantaneous state. The correcting device 2 then acts in accordance with this sequential state on a manipulated variable y of a controlled system 3. When the transition is made into this sequential state, a function allocated to this state and generated in advance is performed, and calculates a new value of the manipulated variable y.

Figure 2:
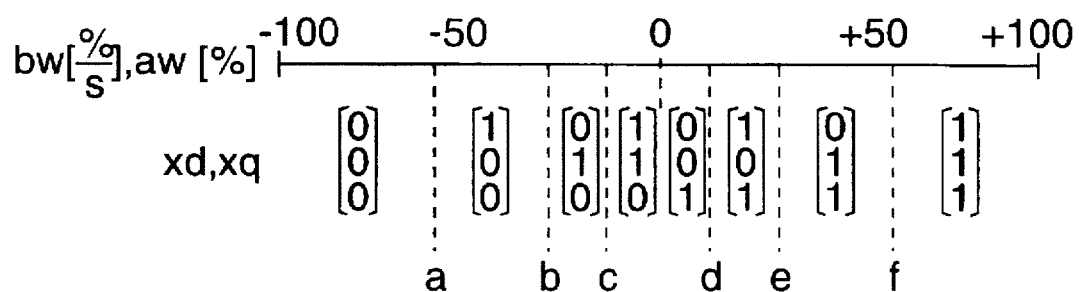
FIG. 2 illustrates the allocation of digital vectors to relative deviations of analog variables within specifiable ranges of values.

For clarification of the control instruction, reference is first made to FIG. 2. FIG. 2 shows the allocation of digital vectors xd and xq to the respective relative deviations aw and bw of analog values. In this case, the three-bit wide digital $$aw = \frac{d}{w} \cdot 100 [\%] \quad \begin{array}{c}\text{vector}\\ xd \\ \text{maps}\end{array}$$

the relative deviation within specifiable limits $$bw = \frac{q}{x} \cdot 100 \; [\%/s]$$

a, b ... f.

Likewise, the three-bit wide digital vector xq maps the relative deviation within specifiable limits a, b ... f, where d signifies the system deviation, w signifies the reference variable, x signifies the acquired controlled variable, q signifies the difference quotient, and s is the unit of time seconds. For example, the digital vectors xd and xq with the coordinates (000) are allocated to the relative deviations aw and bw of the analog variables in a range of −100% to −60%, and the digital vectors xd and xq with the coordinates (111) to the range of +60% to +100%.

Figure 3:
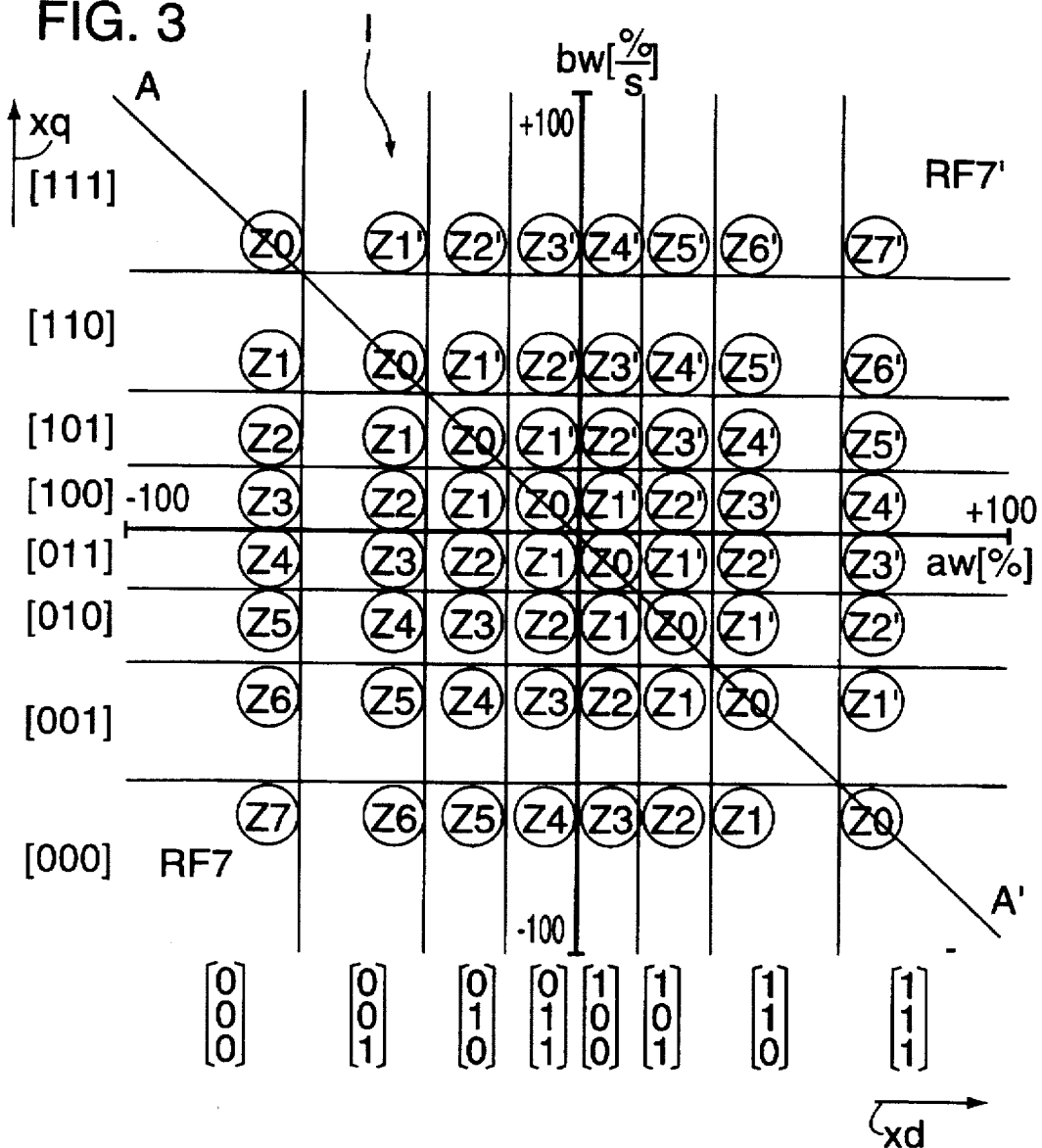
FIG. 3 illustrates the representation of a state plane.

FIG. 3 illustrates a state plane spanned by the digital vectors xd and xq. Based on knowledge about the performance characteristics of the controlled system 3 (see FIG. 1), states Z0, Z1, Z1', . . . are allocated to the grid areas of the state plane. The same state is able to be allocated to a plurality of grid areas. The states Z1', Z2', . . . Z7' are arranged, for example, in mirror symmetry to the axis A–A'. The state Z7 of the grid area RF7 can signify, e.g., "maximum manipulated variable y for accelerating the speed of a motor to the setpoint speed", and the state Z7' of the grid area RF7', "maximum manipulated variable y for reducing the speed of a motor to the setpoint speed".

Figure 4:
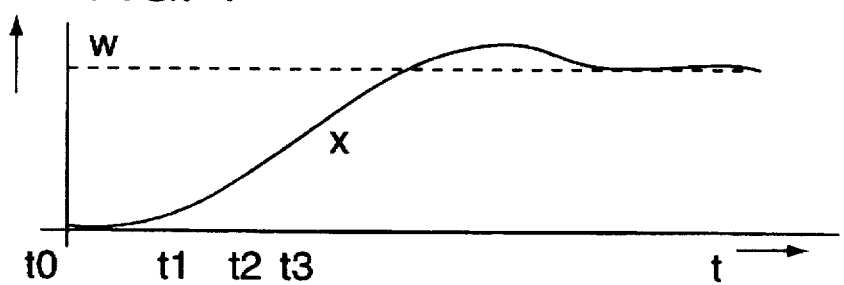
FIG. 4 illustrates the time characteristic of the reference and the controlled variable during one control process in the controlling system according to FIG. 1.
Figure 5:
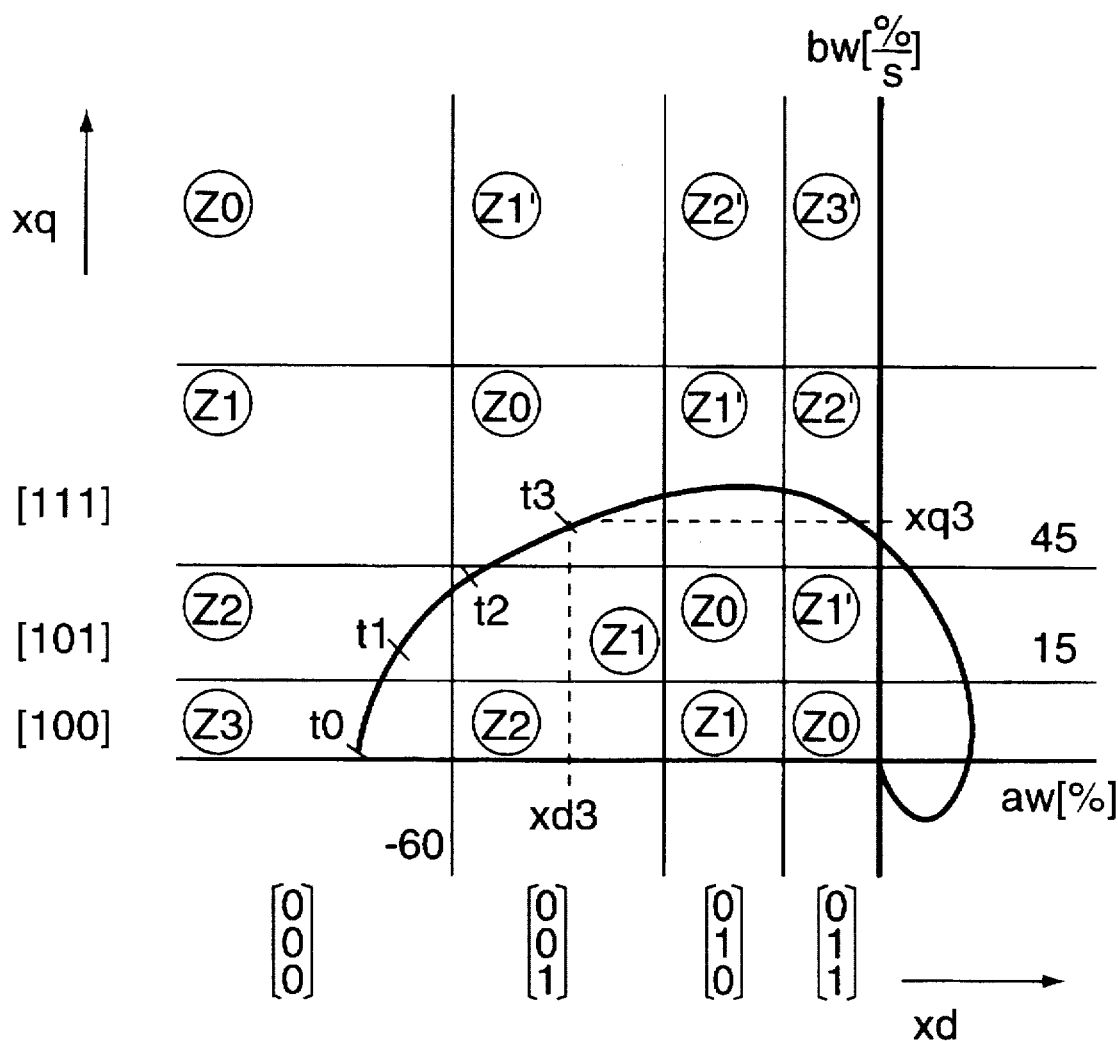
FIG. 5 illustrates the representation of state transitions during the control process.

The method of functioning and mode of operation of the controlling system according to the invention are illustrated in FIGS. 4 and 5. FIG. 5 shows the quadrant of the state plane designated by I in FIG. 3, in which state transitions are depicted at various instants during a control process, as shown in FIG. 4. It is assumed that during the control process, the controlled variable x runs in accordance with the curve depicted in FIG. 4 and that, at an instant t0, the current instantaneous state is the state Z3 (FIG. 5). At an instant t1, the relative deviation aw of the controlled variable x from the reference variable w lies in the range of between about −60% and about −100%. Thus, in accordance with the control instruction, the correcting device 2 produces a digital vector xd=(000) corresponding to this deviation aw (FIG. 2). The relative deviation bw is determined from the difference quotient, which is computed from the controlled variable x at the time instants t0 and t1 as $$x \; (t1) - x \; (t1-t0), \; (t1-t0)$$

and lies within a range of between about +15% and about +30% As a result, the correcting device 2 produces a digital vector xq=(101) and, with the digital vector pair (xd, xq) formed at the instant t1, starting from the instantaneous state Z3 valid at the instant t0, selects the sequential state Z2 (FIG. 3). When the transition is made into this sequential state Z2, a function appropriate to this state is performed and is used to calculate a new value for the manipulated variable y, for example in accordance with the relation:

$$y_{z2} = k2 \cdot y_{z3},$$

where k2 signifies a positive real constant. Accordingly, at an instant t2, with the generated digital vector pair (xd,xq) =((001),(101)), the transition is made from the instantaneous state Z2 valid at the instant t1 into the sequential state Z1, and a new value of the manipulated variable y is calculated, in accordance with the relation:

$$y_{z1} = k3 \cdot y_{z2},$$

where k3 is a positive, real constant. At an instant t3=t2+Δt, the correcting device 2 with the digital vector pair (xd$_3$,xq$_3$) =((001),(110)) changes from the state Z1 into the sequential state Z0. The function corresponding to this sequential state is executed during the state transition with respect to the calculation of the manipulated variable y.

For every state change, the controlling system of the present invention performs an individually executable function to calculate a new value for the manipulated variable y. As a result, for every state transition, the manipulated variable y can be manipulated as needed, thereby making it possible to realize fast controllers with any desired performance characteristics. There is a need to realize controlling systems, which have the property of being independent to the greatest possible extent of the controlled system, and which require a considerably shorter time to calculate the manipulated variable in comparison to known programmable controllers. Another advantage that is attained over conventional controlling systems is that the present invention eliminates the need to tie the controller to an exact PID (proportional-plus-integral-plus-derivative) action with appropriate parameter adjustment kp, ki, kd.

In summary, when the controlling system is in a state Zi(t) at the instant ti and when it samples a newly ordered digital input vector pair xdk, xqk at an instant tk=ti+Δt, then the controlling system goes over to a sequential state Zk allocated to the new input vector pair and, by means of a function fk stored in advance in the memory device of the controlling system that can be selected, as needed, produces a new manipulated variable yk. The "knowledge" of the non-linear characteristics of a controlled system can be considered in the controlled system.

I claim:

1. A controlling system, comprising:
   (a) a comparator unit which determines a system deviation from a reference variable and from a controlled variable;
   (b) a differential device which generates a difference quotient from said controlled variable; and
   (c) a correcting device, arranged downstream from said comparator unit, which determines a manipulated variable and is supplied with said difference quotient; wherein the correcting device accesses a state plane exhibiting a plurality of states and preselects the plurality of states,
   wherein the correcting device allocates coordinates for each state to a specifiable range of system deviation values and difference quotient values,
   wherein the correcting device selects a sequential state from the plurality of states as a function of the coordinates and an instantaneous state, and wherein the correcting device acts on the manipulated variable as a function of the sequential state.

2. The controlling system according to claim 1, wherein said correcting device acts on the manipulated variable in accordance with the sequential state selected by a function created in advance.

* * * * *